United States Patent Office 3,382,188
Patented May 7, 1968

3,382,188
CRACKING CATALYST PREPARATION
Edward B. Cornelius, Swarthmore, James E. McEvoy, Morton, and George Alexander Mills, Swarthmore, Pa., assignors to Air Products and Chemicals, Inc., Philadelphia, Pa., a corporation of Delaware
No Drawing. Filed Feb. 20, 1964, Ser. No. 346,073
2 Claims. (Cl. 252—455)

ABSTRACT OF THE DISCLOSURE

Sodium zeolite is crystallized from system in which NaOH concentration is 90–110% of colloidal $SiO_2$, and $Al_2O_3$ is 4–8% of colloidal $SiO_2$, which is 1 to 2.13 molar, aging at 95–300° C. for 6–24 hours. After washing and ammonium exchange, the ammonium zeolite is mixed with 4 to 19 times as much clay and shaped into particles which are steamed at 700–750° C. for 2–6 hours to prepare acidic cracking catalyst particles.

---

This invention relates to the manufacture of catalytic particles featuring an attrition resistant clay support and an acidic silica-alumina conveniently described as a zeolitic molecular sieve.

Heretofore there has been a recognition that acidic silica-alumina catalysts had effectiveness in promoting a variety of chemical reactions including hydrocarbon conversion such as isomerization, alkylation, polymerization, and cracking. The elevated temperatures at which cracking catalysts are regenerated and the high temperatures at which cracking catalysts are sometimes employed has made the preparation of cracking catalysts somewhat more difficult than the preparation of silica-alumina polymerization catalysts. A variety of silica-aluminas have attained a satisfactory combination of activity, selectivity, and stability for use as catalysts designed for the cracking of gas oil to gasoline in a typical refinery. Although a wide variety of acidic silica-aluminas provided the acceptable catalytic properties most proposed cracking catalysts failed to achieve commercial success, partly because of the difficulty of achieving adequate attrition resistance at a low enough price. In recent years, the competition among different brands of cracking catalysts has been featuring advantages such as attrition resistance, steam stability, price, and characteristics other than mere initial activity. Accordingly, in recent years proposals indicating that certain silica-aluminas might have high activity have been ignored for the same reasons for ignoring the much earlier teachings relating to a great variety of high activity silica-aluminas. Previous literature has suggested the catalytic use of molecular sieves, which generally sell for prices of the magnitude of $3,000 per ton, but such suggestions have aroused little interest because of the known softness of the molecular sieve materials and the order of magnitude of the cost of such molecular sieves.

In accordance with the present invention, highly advantageous particles of catalyst are prepared featuring an attrition resistant refractory porous clay support and from 5% to 20% by weight of zeolitic molecular sieve material derived from a sodium zeolite crystallized in a hot aqueous system at a temperature within the range from 95 to 300° C. during a crystallization period of from about 6 to 24 hours, said aqueous system containing a weight unit ratio of colloidal silica to alumina within the range from 8 to 20 and containing a weight unit ratio of colloidal silica to sodium hydroxide within the range from about 0.5 to 1. The concentration of the silica in the system undergoing hydrothermal crystallization is such as to provide a concentration of silica of at least 60 but less than 180 g. per liter, a range which might be 1 to 3 "molar," except that the concentrations of colloidal materials are conventionally expressed in dimensions comprising weight instead of mols. The small particle size sodium alumina silicate crystals resulting from the hydrothermal treatment of the aqueous system are filtered and washed. Although it is time consuming and difficult to exchange ammonium for sodium in conventional molecular sieve material, and although the residual sodium after such exchange is generally objectionably high, the present invention features the dealkalizing of the molecular sieve material to achieve higher purity ammonium derivatives by conducting the ammonium exchange upon the freshly separated solids from the hydrothermal treatment. Thus, the washed filter cake is exchanged with ammonium ion, and washed to provide ammonium zeolitic molecular sieve crystals having a lower sodium content than might readily be obtained from ammonia-exchanging aged sodium zeolite. The ammonium zeolitic molecular sieve has some of the characteristics of materials designated as ammonium zeolite Y. Because there is some uncertainty concerning its composition, and some evidence suggesting that the thus prepared zeolitic molecular sieve would not be designated as zeolite Y, it is herein designated as a zeolitic molecular sieve prepared in a particular manner. A high proportion of the pores have diameters within the range from 10 to 18 angstroms, thus distinguishing the material from most of the proposed zeolitic molecular sieve materials, which generally feature smaller pore diameters.

The thus prepared zeolitic molecular sieve catalysts in the ammonium form is combined with a quantity of plastic clay at least 4 but not more than about 19 times the weight of the zeolitic molecular sieve catalysts. This composition is shaped into particles, which are calcined to evolve ammonia (thereby transforming the ammonium zeolite into a hydrogen zeolite) and to impart attrition resistance to the porous refractory clay support. The deammoniated particles are treated in an atmosphere containing 10 to 100% steam at a temperature from 700 to 750° C. for from 2 to 6 hours to prepare catalyst particles having an advantageous combination of activity, selectivity, and stability.

The hydrothermal crystallization to obtain a satisfactory zeolitic molecular sieve starting with the silica in colloidal form can be achieved at conditions somewhat less severe than might be appropriate starting with sodium silicate. A ratio of about 21 moles of sodium hydroxide to about 20 moles of silica to about 1 mole of alumina trihydrate provides appropriate proportions among the reactants. The concentrations of silica in the mixture should be within the weight range from about 60 to about 180 g. per liter, which concentration range is conveniently designated as 1 to 3 "molar." Chemists understand that colloidal solutions contain a difficultly measured number of colloidal particles per liter but a precisely measurable number of gram molecular weights of the colloidal compound per liter. The aqueous system containing silica in the desired concentration and containing a molar concentration of alumina which is about 5 percent of the silica concentration and containing sodium ion (derived initially from sodium hydroxide) in a molar concentration about equal to the sum of such silica and alumina concentrations, may be prepared by the steps of: adding sodium hydroxide to distilled water; adding alpha alumina trihydrate to the aqueous sodium hydroxide; and adding an aqueous solution of colloidal silica to such aluminate-containing solution of sodium hydroxide.

CATALYST EVALUATION PROCEDURE

The apparatus and procedure for measuring the activity of a catalyst incorporated most of the features of the Cat A test (article by J. Alexander and H. G. Shimp, page R537, National Petroleum News, Aug. 2, 1944), but using 10% steam with the charge, using steam instead of nitrogen in the preheat and purge, using 900° instead of 800° F., using a 15 minute instead of 10 minute run (1.0 instead of 1.5SR), and using other similar modifications. Unless otherwise noted, the Cat A apparatus and procedure carry over into the improved analytical procedure described and employed herein.

An electrically heated tubular furnace is positioned vertically around a preheater and a catalyst case. The catalyst case is a glass tube about 2.8 cm. diameter and about 48 cm. in height, having a capacity of about 220 ml. and filled with exactly 200 ml. of catalyst granules between upper and lower screens. Spherical joints connect the bottom of the catalyst case with a Graham type condenser about 48 cm. high, which discharges the condensate into a 75 ml. flask. Both the flask receiver and condenser are cooled to maintain surface temperatures near 15.6° C. (60° F.). Gaseous effluent leaving the receiver is collected in a gas receiving bottle over water. A water cooled burette is adjusted to direct a stream providing 50 ml. of gas oil during the exactly 15 minutes run, so that the v./v./h. space rate is one. The catalyst to oil ratio is 4 to 1. Steam is preheated to about 510–530° C. but cools to a lower temperature before contacting the preheater, which is maintained at about 501.7° C. (935° F.) during the 10 minute preheat, 15 minute run, and 5 minute purge. The steam passes through the catalyst bed during all of the 30 minutes of the activity test, and constitutes 10% by weight of the gas oil during the testing of the catalyst. The preheater contains inert granules.

The apparatus required for the regeneration of the catalyst includes the vertical tubular furnace, preheater and catalyst case previously described plus: a catalytic purifier maintained at about 510° C. and adapted to burn the carbon monoxide to carbon dioxide over a copper oxide on clay catalyst; and a flask containing soda-lime for absorbing all the carbon dioxide in the regeneration gas stream.

The synthetic crude collected in the receiver is distilled through an insulated packed column to measure in a water cooled (15.6° C. or 60° F.) graduate the volume of 210° C. (410° F.) end boiling point gasoline. The heat is applied at a rate such that the gasoline is distilled during from 40 to 60 minutes.

Temperature in the catalyst bed and preheater are continuously scanned by a recording potentiometer intermittently receiving signals from each of several thermocouples.

An East Texas crude is distilled to recover 45–83% by volume as a standard gas oil suitable for this procedure for evaluating cracking catalyst. This gas oil flows from the burette to the preheater in which the gas oil vapors and steam become a more uniform down-flowing gas stream. The gas oil is cracked by the catalyst, and the vapors are condensed to a synthetic crude collected in the receiver. Distillation provides the measurement of the volume of gasoline produced by the 900° F. cracking. Gas density and the percent of coke formed in the catalyst are also measured.

An evaluation of a catalyst involves a plurality of runs so that a majority of runs and at least three runs have gasoline yields within a range of 1.5% and coke yields within a range of 0.3%.

The catalyst activity test using 10% weight steam at (900° F.) 482.2° C. has proven to correlate more satisfactorily with industrial cracking performance and to have other advantages over the Cat A test.

The catalyst of the invention is further clarified by reference to a plurality of examples:

Example I

An aqueous solution of sodium hydroxide was prepared by heating 5500 milliliters of distilled water and 1050 grams (26 moles) of sodium hydroxide at about 60° C. To the solution, 195 grams (1.25 moles) of alpha alumina trihydrate were added, and to the aluminate-containing alkali solution, 5000 g. of aqueous solution, containing 30 weight percent silica as colloidal silica, was added until 1500 grams of the colloidal silica solution had been added. This mixture contained 1500 g. (25 moles) of silica, constituting about 12.9 weight percent of the 11,645 grams of aqueous system. The molar concentrations of the three important ingredients of the aqueous system were: silica, 2.14 M; alumina, 0.107 M; and sodium ion, 2.26 M, providing molar ratios of 20:1:21 respectively.

The thus prepared aqueous system was transferred to a reactor having a reflux condenser and thermometer for the purpose of maintaining the reaction mixture at 100° C. during a period of 15 hours of hydrothermal crystallization. At the end of 15 hours, the reaction mixture contained small crystals of a sodium aluminosilicate together with an aqueous dispersion of generally water soluble materials. The reaction mixture was filtered to recover crystals of sodium aluminosilicate having the uniform pore size of a zeolitic molecular sieve. The filtrate was rinsed with various 600 milliliters batches of wash liquid. Substantially all the mother liquor was rinsed from the crystals of zeolitic molecular sieve by 3 washings with distilled water. The sodium form of the molecular sieve was transformed to the ammonium form by 5 washings with an aqueous solution containing 20% ammonium nitrate. The completeness of the ammonium exchange was significantly greater than in control tests on dried and aged sodium zeolite, thus establishing the superiority of the method featuring the ammonium exchange with the freshly prepared material. The excess ammonium nitrate was rinsed away by 2 washings with distilled water. In establishing the exact yield of purified ammonium zeolitic molecular sieve material, it was necessary to dry and weigh the intermediate ammonium aluminosilicate but such drying would not be necessary in repetitive manufacturing operations. Since subsequent heat treatment volatilizes ammonium from the base exchanged material the intervening rinsing or washing may be minimal or even eliminated if desired. The ammonium aluminosilicate crystals were dried for 4 hours at 105° C., cooled, and weighed and found to be 409 grams of zeolitic molecular sieve.

A mixture is prepared of 200 grams of said ammonium zeolite and 1800 grams of Edgar Plastic Kaolin, a kaolin containing less than 0.5% iron and less than 0.6% fluxing agents such as oxides of the alkali and alkaline earth metals. The mixture of ammonium zeolite and kaolin is moistened to provide an extrudable composition and extruded through 4 mm. diameter openings. The cylinders are sliced into particles about 4 mm. long. The particles are calcined in flowing air to transform the kaolin carrier into a rugged porous refractory material and to transform the zeolitic molecular sieve by the evolution of ammonia from the ammonium zeolite. The thus prepared particles are unsatisfactory as cracking catalysts, as demonstrated in an evaluation of the catalyst by the previously described procedure. However, after an activation treatment in an atmosphere containing at least 10% steam at a temperature of about 700° C., for at least four hours the particles have outstanding catalytic properties, as demonstrated by following said standard catalyst evaluation procedure. Moreover, such catalyst particles can withstand adverse conditions such as might arise in upset regulation of regeneration, as demonstrated in the standard evaluation of the catalyst subsequent to treatment in 100% steam for four hours at 830° C. Thus, the catalyst performs as a cracking catalyst with an advantageous combination of activity, selectivity, and stability. Moreover, its crushing strength and attrition resistance are superior to those of particles containing a major amount of zeolitic molecular sieve material. The data relating to the tests are:

| | °C. Steaming | Gaso. Vol. Percent | Coke Wt. Percent | Gas Wt. Percent | Gas Grav. | Conv. Wt. Percent | Selec. Wt. Percent |
|---|---|---|---|---|---|---|---|
| (560° dry) | None | 37.3 | 8.2 | 27.0 | 1.54 | 68 | 48.3 |
| (700° dry) | None | 35.0 | 9.0 | 28.6 | 1.50 | 68.4 | 45.8 |
| | 700 | 60.1 | 3.7 | 21.7 | 1.65 | 67.5 | 67.5 |
| | 815 | 56.1 | 2.6 | 12.9 | 1.57 | 61.8 | 76.2 |

The steam treatment at 700° C. for four hours imparts improved properties to the catalyst.

Example II

An aqueous solution of sodium hydroxide is modified by the addition of alumina trihydrate to provide an aqueous solution containing 20% sodium hydroxide and 4% alumina trihydrate. Rapid mixing with an equal volume 28.6% of a colloidal silica solution provided a composition containing by weight 10% sodium hydroxide, 2% alumina trihydrate and 14.3% silica, providing molar ratios of 18.5:1:19.5 respectively for silica to alumina trihydrate to sodium hydroxide. The molar concentrations are 2.38 M silica, 0.128 M alumina trihydrate, and 2.5 M sodium hydroxide. The system is hydrothermally treated in an autoclave at 150° C. for six hours to bring about the crystallization of a zeolitic molecular sieve material. After cooling and filtration, the filter cake is washed to remove occluded mother liquor.

Particular attention is directed to the step of treating the freshly prepared sodium zeolite with an aqueous solution of an ammonium salt, desirably a 20% solution of ammonium nitrate. A highly advantageous degree of completion of the ammonium exchange is attained with remarkable speed by reason of the exchange capacity of the freshly formed crystals of relatively small size.

The thus prepared ammonium zeolite is mixed with nine times its weight of halloysite clay, formed into small balls about 5 mm. diameter, and calcined to provide porous clay pellets containing 10% zeolitic molecular sieve material. The balls are treated for six hours in an atmosphere containing 10% steam at 700° C. to provide cracking catalyst granules having a superior combination of stability, activity, and selectivity. Moreover, the ability of the spherical cracking catalyst particles to withstand treatment in steam at 820° C. (1508° F.) for one hour without significant loss of activity and selectivity establishes the cracking catalyst as featuring a commercially satisfactory steam stability.

Example III

A series of ammonium zeolites are prepared by methods featuring the treatment of the fresh filter cake with an aqeous solution of ammonium salt. In the various preparations, the concentration of colloidal silica in the solution subjected to the hydrothermal treatment is varied, suitable concentrations in grams per liter being 61, 75, 90, 100, 125, 150, 175, and 179. The concentration of other components is varied as a function of the molar concentration of the silica. The alumina trihydrate concentration is satisfactory at 4%, 5%, 6%, 7.5% and 7.9% of the molar concentration of the silica. The sodium hydroxide molar concentration is satisfactory at 90%, 95%, 100%, 105%, and 110% of the silica molar concentration. Thus the molar concentration of the sodium hydroxide is oftentimes approximately equal to the sum of the molar concentrations of the silica and alumina.

The hydrothermal treatment, if conducted at atmospheric pressure (and hence at a temperature above 95° C. but not greatly exceeding 100° C.) requires at least 7 hours and up to 24 hours. The use of an autoclave and superatmospheric pressure and temperatures of the 110–300° C range permits reaction times within the 6 to 12 hour range.

The sodium zeolite crystals are separated from the hydrothermal system, washed, and exchanged while fresh with an aqueous solution of ammonium salt, preferably a salt of a readily volatilizable anion such as nitrate, carbonate, formate, or oxalate. The ammonium zeolite is mixed with from 4 to 19 times its weight of clay.

Only clays containing less than 1% and preferably less than 0.5% iron as $Fe_2O_3$ are considered satisfactory in that iron in the clay support may be activated, particularly in the processing of sulfur-containing hydrocarbon charge stocks, to produce an undesirable catalytic effect. Likewise, suitable clays for use as support should contain only moderate amounts of fluxing agents, such as the oxides of the alkali and alkaline earth metals, to avoid excessive fluxing of the clays during calcination and thus avoiding the formation of low porosity, low adsorptivity product. In general the amount of fluxing agents is less than 1% by weight of the clay. Suitable clays are those which can be calcined to provide a relatively inert, porous, attrition-resistant, impact-resistant carrier for the molecular sieve. Kaolins and halloysites are preferred clays. Bentonite may be acid leached to provide a suitable clay material. Other clays readily treated to provide an acceptably low iron content and satisfactory alkali content and calcinable to provide the desired catalyst carrier properties are also suitable.

In all cases, the composite particles of ammonium zeolite and clay are calcined and then activated in an atmosphere containing at least 10% and up to 100% steam at a temperature in the 700–750° C. range for from 2 to 6 hours. During the calcining, steam is evolved, and the ammonium zeolite is transformed into a hydrogen zeolite.

Obviously many modifications and variations of the invention as hereinbefore set forth may be made without departing from the spirit and scope thereof, therefore only such limitations should be imposed as are indicated in the appended claims.

What is claimed is:

1. A method of preparing catalysts which consists essentially of the steps of: preparing an aqueous system containing a concentration of colloidal silica of at least 60 grams per liter but less than 180 grams per liter, said aqueous system containing a molar concentration of alumina which is at least 4% but less than 8% of the molar concentration of the colloidal silica, and said aqueous system containing a molar concentration of sodium hydroxide which is from about 90% to about 110% of the molar concentrations of the silica; hydrothermally treating said freshly prepared aqueous system at a temperature within the range from about 95° C. to about 300° C. for from about 6 to about 24 hours, whereby zeolitic molecular sieve crystals comprising sodium aluminosilicate are formed in the aqueous system said crystals featuring large pores having diameters within the range from 10 to 18 angstroms; filtering the system to recover said large pore sodium aluminosilicate crystals; washing said large pore sodium aluminosilicate crystals with water; treating the freshly prepared large pore sodium aluminosilicate crystals with an aqueous solution of an ammonium salt to remove a high proportion of the sodium components contained therein and to prepare crystals of large pore ammonium aluminosilicate; mixing the large pore ammonium aluminosilicate crystals with a quantity of clay constituting at least 4 but less than 19 times the weight of the large pore ammonium aluminosilicate; shaping the mixture of clay and large pore ammonium aluminosilicate into particles; calcining the shaped particles whereby ammonia is evolved; treating the deammoniated particles with an atmosphere containing from 10% to 100% steam at a temperature in the 700° to 750° C. range for from 2 to 6 hours; and cooling the steam treated aluminosilicate in clay particles to provide particles having acidic cracking catalytic activity.

2. A method of preparing cracking catalysts which consists essentially of the steps of: preparing an aqueous system containing a concentration of colloidal silica of about 129 grams per liter and about 10.9 grams per liter of alumina, and about 90.5 grams per liter of sodium hydroxide; hydrothermally treating said aqueous system at about 100° C. for about 15 hours, whereby zeolitic molecular sieve crystals comprising sodium aluminosilicate are formed in the aqueous system said sodium aluminosilicate featuring large pores having diameters within the range from 10 to 18 angstroms; filtering the system to recover the sodium aluminosilicate crystals; washing the sodium aluminosilicate crystals with water; treating the freshly prepared sodium aluminosilicate crystals with an aqueous solution of an ammonium salt to remove a high proportion of the sodium components contained therein and to prepare crystals of ammonium aluminosilicate; washing the crystals with water to remove excess solution of the ammonium salt; mixing the ammonium aluminosilicate crystals with a quantity of clay constituting at least 4 but less than 19 times the weight of the ammonium aluminosilicate; shaping the mixture of clay and ammonium aluminosilicate into particles; calcining the shaped particles whereby ammonia is evolved; treating the deammoniated particles with an atmosphere containing from 10% to 100% steam at a temperature in the 700° to 750° C. range for from 2 to 6 hours; and cooling the steam treated aluminosilicate in clay particles to provide particles having acidic cracking catalytic activity.

References Cited
UNITED STATES PATENTS

| | | | |
|---|---|---|---|
| 2,973,327 | 2/1961 | Mitchell et al. | 252—449 |
| 3,257,310 | 6/1966 | Plank et al. | 252—455 X |
| 3,287,282 | 11/1966 | Stiles | 252—455 |

DANIEL E. WYMAN, *Primary Examiner.*

CARL F. DEES, *Assistant Examiner.*